US008693046B2

(12) United States Patent
Matsumura (10) Patent No.: US 8,693,046 B2
(45) Date of Patent: Apr. 8, 2014

(54) PRINTING APPARATUS THAT PRINTS WITH CHANGED PRINT SETTINGS, CONTROL METHOD FOR PRINTING APPARATUS, AND STORAGE MEDIUM

(75) Inventor: Takeshi Matsumura, Yokohama (JP)

(73) Assignee: Canon Kabushiki Kaisha (JP)

( * ) Notice: Subject to any disclaimer, the term of this patent is extended or adjusted under 35 U.S.C. 154(b) by 41 days.

(21) Appl. No.: 13/467,141

(22) Filed: May 9, 2012

(65) Prior Publication Data

US 2012/0287446 A1   Nov. 15, 2012

(30) Foreign Application Priority Data

May 11, 2011   (JP) .................................. 2011-106622

(51) Int. Cl.
*H04N 1/00* (2006.01)
(52) U.S. Cl.
USPC ............................................................ 358/1.6

(58) Field of Classification Search
None
See application file for complete search history.

(56) References Cited

U.S. PATENT DOCUMENTS

| 5,956,160 A * | 9/1999 | Watanabe ...................... 358/496 |
| 2002/0105674 A1* | 8/2002 | Nomura et al. ............... 358/1.15 |
| 2009/0237728 A1 | 9/2009 | Yamamoto |

FOREIGN PATENT DOCUMENTS

| JP | 2005-161819 A | 6/2005 |
| JP | 2009-230253 A | 10/2009 |

* cited by examiner

*Primary Examiner* — Jeremiah Bryar
(74) *Attorney, Agent, or Firm* — Rossi, Kimms & McDowell, LLP (57) ABSTRACT

The present invention provides technology according to which, in the case of changing a print setting and performing reprinting, a printing apparatus causes an information processing apparatus to regenerate print data via a network as necessary depending on whether processing in accordance with a changed print setting can be executed by the printing apparatus.

7 Claims, 9 Drawing Sheets

| JOB ID | USER ID | SAVED DATA | DATA ID | HOSTNAME | IP ADDRESS |
|---|---|---|---|---|---|
| 1 | 101 | YES | 1 | COMP1 | 1...* |
| 2 | 113 | NO | — | COMP2 | 1...* |
| 3 | 1234 | YES | 2 | COMP3 | 1...* |
| 4 | 1124 | YES | 3 | COMP4 | 1...* |

| RE-GENERATION POSSIBLE | RE-GENERATION NOT POSSIBLE |
|---|---|
| DENSITY | COLOR PROCESSING CONTENT |
| BASE COLOR | PATTERN |
| DITHER PROCESSING | PROCESSING IMAGE RESOLUTION (PROCESSING QUALITY) |
| MONOCHROME MULTI-VALUE PROCESSING (MONOCHROME PROCESSING) | GRAY COMPENSATION |

| PRINT SETTING TO BE CHANGED BY USER | DISPLAY CONTENT |
|---|---|
| COLOR PROCESSING CONTENT | COLOR PROCESSING SETTING SCREEN |
| PATTERN | PATTERN SELECTION SCREEN |
| PROCESSING IMAGE RESOLUTION | RESOLUTION SETTING SCREEN |
| GRAY COMPENSATION | GRAY COMPENSATION SETTING SCREEN |

DETAILED SETTINGS                                    ☒

GRAPHICS MODE (G)
  ⦿ LIPS MODE
  ○ IMAGE MODE

MODE DETAILS (T):        1BPP           ▽
HALFTONE(A):             PATTERN 2      ▽
HOST RENDERING (Z):      AUTO           ▽
TONER SAVING MODE (S):   DO NOT USE     ▽

PROCESSING OPTIONS (N)

OK      CANCEL     HELP(H)

PRINTING APPARATUS THAT PRINTS WITH CHANGED PRINT SETTINGS, CONTROL METHOD FOR PRINTING APPARATUS, AND STORAGE MEDIUM

BACKGROUND OF THE INVENTION

1. Field of the Invention

The present invention relates to a printing apparatus that can execute reprinting using data saved internally, a method for controlling the printing apparatus, and a storage medium.

2. Description of the Related Art

Conventionally, with printing apparatuses such as printers and multi-function peripherals (MFPs), there is known to be technology in which, in the case of printing an image using print data received from an external apparatus such as a PC, the print data is spooled in a storage device. With such a printing apparatus, when a reprint instruction for print data that has been printed is accepted from a user, image reprinting is executed using the print data spooled in the storage device. Also, when a reprint instruction is given, if a change to a print setting has been accepted via an operation panel or the like that the printing apparatus is provided with, the printing apparatus executes printing using the print data spooled in the storage device based on the changed print setting. Accordingly, with such a printing apparatus, in the case where the user visually checks a print result after performing printing and desires to change a print setting and perform printing again, reprinting can be instructed from the operation panel that the printing apparatus is provided with without re-transmitting the print data from the user's PC to the printing apparatus.

For example, Japanese Patent Laid-Open No. 2005-161819 proposes a printing apparatus that can designate, on a page-by-page basis, whether print job data (PDL data) received from an external host computer is to be spooled as the original PDL, or is to be spooled after being converted into raster data. Also, Japanese Patent Laid-Open No. 2009-230253 proposes technology in which, when an external information processing apparatus is controlled from a printing apparatus in accordance with user operations using remote desktop technology, the transmission destination of an image processing job such as printing from the information processing apparatus is automatically switched to an image processing apparatus. With the image processing apparatus of Japanese Patent Laid-Open No. 2009-230253, a print setting can be changed (re-designated) by remotely controlling the information processing apparatus from the image processing apparatus using remote desktop technology.

According to the aforementioned Japanese Patent Laid-Open No. 2009-230253, when reprinting is performed, by remotely controlling the information processing apparatus that is the transmission source of the print data from the printing apparatus, a print setting can be changed in the information processing apparatus, and print data re-generated based on the changed print setting can be re-transmitted from the information processing apparatus to the printing apparatus. In this way, in the case of remotely controlling the information processing apparatus that is the transmission source of the print data, basically any type of change to a print setting can be handled. However, in the case where a print setting is changed and reprinting is performed, if such remote control is always executed via a network, the processing load may increase for both the printing apparatus and the information processing apparatus due to the remote control, and load placed on the network may increase as well.

On the other hand, in the case where reprinting is performed using print data saved in the storage device based on a print setting that was changed by an operation performed on the printing apparatus as in Japanese Patent Laid-Open No. 2005-161819, it is possible for there to be cases where reprinting cannot be executed based on a changed print setting. Specifically, in the case where, depending on the format of the data saved in the storage device and the content of the change to the print setting, the re-generation of print data based on a changed print setting cannot be performed by the printing apparatus alone, it is not possible to change a print setting and execute reprinting. In this case, unless the above-described remote controlling is used, the user needs to move to the place where the information processing apparatus that is the transmission source of the print data is located and operate the information processing apparatus to change a print setting and re-transmit the re-generated print data, which can be an increased burden on the user. Accordingly, performing reprinting using remote controlling as described above when necessary will be desirable for reducing the burden on the user.

SUMMARY OF THE INVENTION

The present invention was achieved in light of the aforementioned problems. A feature of the present invention is that in the case of changing a print setting and performing reprinting, a printing apparatus causes an information processing apparatus to re-generate print data via a network as necessary depending on whether processing in accordance with a changed print setting can be executed by the printing apparatus.

According to one aspect of the present invention, there is provided a printing apparatus comprising: a first reception unit configured to receive print data from an information processing apparatus; a storage unit configured to store the print data received by the first reception unit; an accepting unit configured to accept an instruction for changing a print setting for the print data stored by the storage unit; a determination unit configured to determine whether processing in accordance with the changed print setting can be executed by the printing apparatus; a display unit configured to display, if the determination unit determines that processing in accordance with the changed print setting cannot be executed by the printing apparatus, an operation screen used to be displayed by a display unit of the information processing apparatus; an instruction unit configured to instruct the information processing apparatus to transmit print data on which processing in accordance with the changed print setting has been executed via the operation screen displayed by the display unit; a second reception unit configured to receive, from the information processing apparatus, the print data on which processing in accordance with the changed print setting was executed in accordance with the instruction given by the instruction unit; and a printing unit configured to execute printing in accordance with the print data received by the second reception unit.

According to another aspect of the present invention, there is provided a method for controlling a printing apparatus comprising; receiving print data from an information processing apparatus; storing the print data received in the first receiving step in a storage unit; accepting an instruction for changing a print setting for the print data stored in the storage unit; determining whether processing in accordance with the changed print setting can be executed by the printing apparatus; displaying, if it was determined in the determining step that processing in accordance with the changed print setting cannot be executed by the printing apparatus, an operation screen used to be displayed on a display unit of the information processing apparatus, on a display unit of the printing apparatus; instructing the information processing apparatus to transmit print data on which processing in accordance with the changed print setting was executed via the operation screen displayed on the display unit; receiving, from the information processing apparatus, the print data on which processing in accordance with the changed print setting was executed in accordance with the instruction given in the instructing step; and executing printing in accordance with the received print data.

According to the present invention, technology is provided in which, with a printing apparatus that can remotely control an information processing apparatus that is the transmission source of print data, in the case of changing a print setting and performing reprinting, a decision is made as to whether processing in accordance with a changed print setting can be executed by the printing apparatus, and the information processing apparatus is caused to re-generate the print data via network as necessary. Accordingly, in the case where a print setting is changed and reprinting is executed by the printing apparatus, user convenience is improved without an unnecessary increase in the network load or processing load attributed to control performed via the network.

Further features of the present invention will become apparent from the following description of exemplary embodiments with reference to the attached drawings.

DESCRIPTION OF THE EMBODIMENTS

Hereinafter, embodiments of the present invention will be described in detail with reference to the accompanying drawings. It should be noted that the following embodiments are not intended to limit the scope of the appended claims, and that not all the combinations of features described in the embodiments are necessarily essential to the solving means of the present invention.

First Embodiment

Configuration of Printing System

Figure 1:
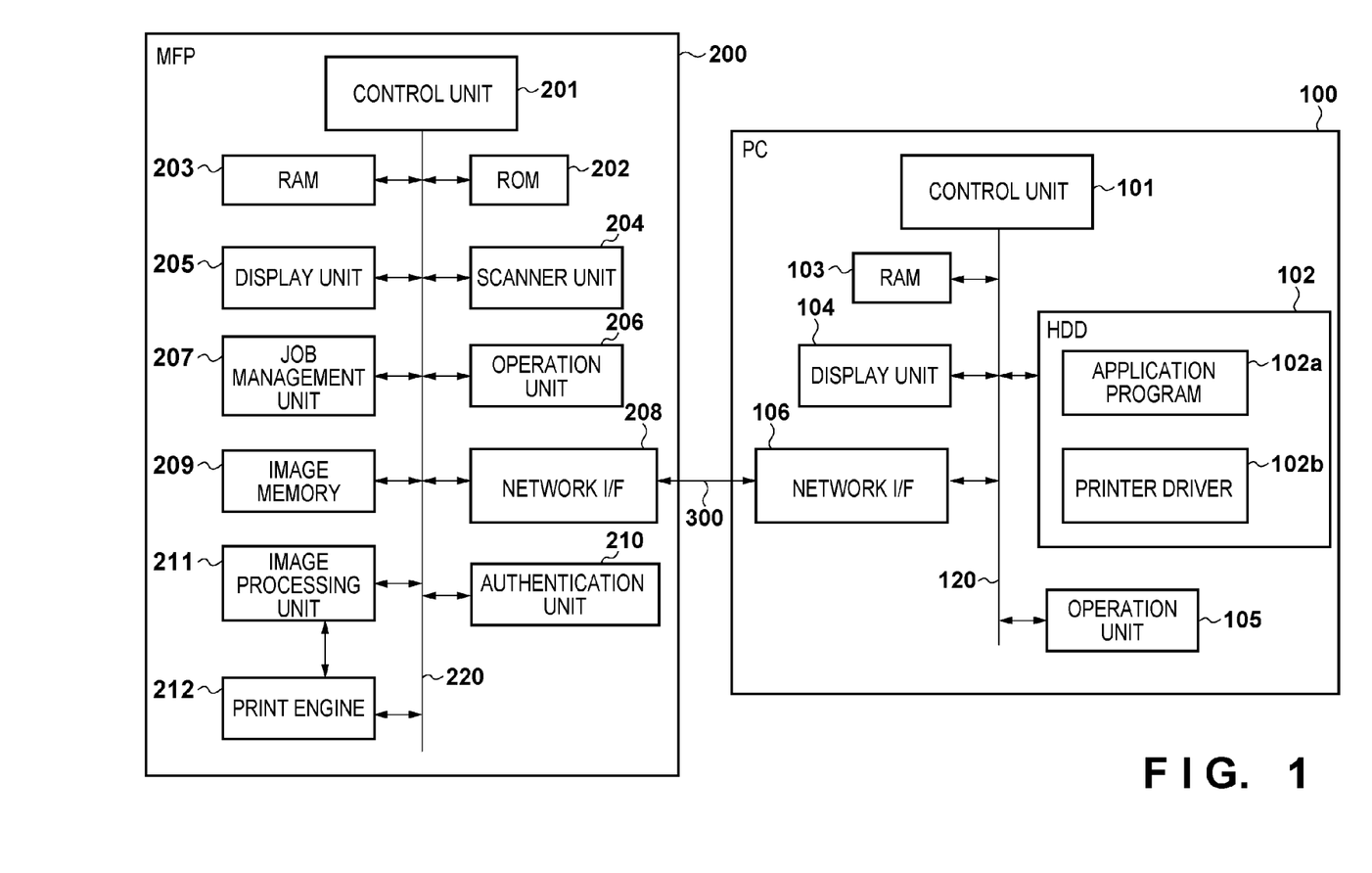
FIG. 1 is a diagram showing an example of the configuration of a printing system according to a first embodiment.

The first embodiment describes an example in which a printing apparatus of the present invention is applied to a multi-function peripheral (MFP). FIG. 1 is a diagram showing an example of the configuration of a printing system including an information processing apparatus (PC) 100 and an MFP 200 of the present embodiment.

Configuration of PC 100

The PC 100 includes a control unit 101, a hard disk drive (HDD) 102, a RAM 103, a display unit 104, an operation unit 105, and a network interface (I/F) 106. These devices are connected to each other via a system bus 120. The control unit 101 is constituted by a CPU and the like, and controls the devices connected to the system bus 120 by reading out computer programs stored in the HDD 102 to the RAM 103 and executing them. The HDD 102 stores various types of computer programs necessary for the operation of the PC 100. For example, the HDD 102 stores an application program 102a for creating documents, graphics, photographs, and the like, and a printer driver 102b for creating print jobs that are to be transmitted to the MFP 200. The RAM 103 functions as a main memory, a work area, and the like for the CPU included in the control unit 101, and temporarily stores various types of data generated in the control operations performed by the CPU.

The display unit 104 is a display device such as a liquid crystal display (LCD) device or a CRT display. The operation unit 105 includes input devices such as a keyboard and a mouse, and notifies the control unit 101, via the system bus 120, of operation information indicating the content of user operations performed on the input devices. The network I/F 106 is an interface circuit for performing communication with an external apparatus such as the MFP 200 via a network 300 such as a LAN.

In the PC 100, a print job for performing printing using application data created by the application program 102a is created by the control unit 101 executing the printer driver 102b. A print job includes print setting information indicating print settings such as the sheet size, n-up printing, double-sided printing, and the stapling direction, and print data created by the application program 102a. Note that the print data is described in page description language (PDL) or the like.

Configuration of MFP 200

The MFP 200 includes a control unit 201, a ROM 202, a RAM 203, a scanner unit 204, a display unit 205, an operation unit 206, a job management unit 207, a network I/F 208, an image memory 209, an authentication unit 210, an image processing unit 211, and a print engine 212. These devices are connected to each other via a system bus 220. The control unit 201 is constituted by an MPU (Micro Processing Unit) and the like, and controls the devices connected to the system bus 220 by reading out computer programs stored in the ROM 202 to the RAM 203 and executing them. The ROM 202 stores various types of computer programs, such as a control program, that are necessary for operations performed by the MFP 200. The RAM 203 functions as a main memory, a work area, and the like for the MPU included in the control unit 201, and temporarily stores various types of data generated in the control operations performed by the MPU.

The display unit 205 is a display device such as a liquid crystal display (LCD), and displays data of which the user is to be alerted, the operation state of the MFP 200, and characters and the like input from the operation unit 206. The operation unit 206 includes input devices such as character keys, a ten-key pad, and various types of function keys, and notifies the control unit 201, via the system bus 220, of operation information indicating the content of user operations performed on the input devices. Note that a touch panel may be provided on the display unit 205 as an input device belonging to the operation unit 206. In this case, when the user operates the touch panel based on display content such as soft keys displayed on the display unit 205, the operation unit 206 notifies the control unit 201 of information regarding the operations via the system bus 220. The network I/F 208 is an interface circuit for performing communication with an external apparatus via the network 300. In the present embodiment, the MFP 200 can communicate with the PC 100 via the network 300.

The image memory 209 is constituted by a DRAM or the like, and stores image data obtained (received) from an external apparatus such as the PC 100 via the network I/F 208. The image memory 209 stores, for example, print data described in PDL and compressed data obtained by compressing print data, as image data. The image memory 209 can also store a print job obtained from the PC 100. When the MFP 200 obtains a print job, the job management unit 207 allocates a job ID to the obtained print job, and stores the print job in the image memory 209. The job management unit 207 also manages information regarding print jobs stored in the image memory 209 (as will be described later with reference to FIG. 5).

A print job obtained from the PC 100 includes print data that was created by the PC 100 and is described in PDL, and information indicating print settings designated in the PC 100 by the user (print setting information). The image processing unit 211 creates a print image (raster image) based on the print settings indicated by the print setting data included in the obtained print job, and inputs the created print image to the print engine 212. Accordingly, the image processing unit 211 causes the print engine 212 to execute image printing based on the print image. Note that as will be described later, in the present embodiment, print job print settings can be changed using the operation unit 206 provided in the MFP 200.

The print engine 212 is an electrophotographic printing device and forms an image based on the print image created by the image processing unit 211 onto the surface of a recording material of the appropriate size. Note that the recording material on which the image is formed may be recording paper (a sheet), or may be an OHP sheet, for example.

The authentication unit 210 obtains, from the operation unit 206, authentication information such as a user ID and password that were input by the user via the operation unit 206, and also executes authentication processing based on the obtained authentication information. The authentication unit 210 may be able to obtain authentication information using fingerprint authentication, a magnetic card, an IC card, a mobile phone, a mobile information terminal (PDA), or the like. In this case, for example, the authentication unit 210 may include an infrared port or radio (Bluetooth) port, and receive authentication information from the mobile phone, the mobile information terminal, or the like via those ports. Also, in the case where the authentication unit 210 includes a fingerprint authentication apparatus, the authentication unit 210 may obtain, as authentication information, information regarding the user's fingerprint that was read by the fingerprint authentication apparatus. Furthermore, in the case where the authentication unit 210 includes a card reader, the authentication unit 210 may obtain the authentication information by reading information contained in a magnetic card, an IC card, or the like using the card reader.

Basic Operations of Printing System

In the printing system of the present embodiment, the user of the PC 100 operates the PC 100 so as to use the application program 102a to create print data for printing performed by the MFP 200. In the case of performing printing based on the created print data, the user operates the PC 100 so as to use the printer driver 102b to designate a print setting to be used when printing is performed based on the print data. Also, the user operates the PC 100 so as to use the printer driver 102b to designate whether the print data is to be saved (spooled) in the MFP 200 when printing is performed.

When the designation of the print settings and the like by the user has been completed, the PC 100 generates a print job including the generated print data and designated print settings. Thereafter, the PC 100 transmits the generated print job to the MFP 200 if it has been designated that the print data is not to be saved in the MFP 200. On the other hand, if it has been designated that the print data is to be saved in the MFP 200, the PC 100 attaches a saving instruction, which is for instructing the MFP 200 to save the print data, to the generated print job, and transmits the resulting print job to the MFP 200.

The print job transmitted from the PC 100 is received by the MFP 200. Upon obtaining the print job from the PC 100, the MFP 200 stores the print job in the image memory 209 under control of the job management unit 207. Furthermore, based on the print settings included in the print job, the MFP 200 creates a print image from the print data included in the print job and prints the created print image using the print engine 212. Note that if a print image is included in the print job from the PC 100, the PC 100 can print that print image using the print engine 212.

Print Job Generation Processing in PC 100

Figure 2:
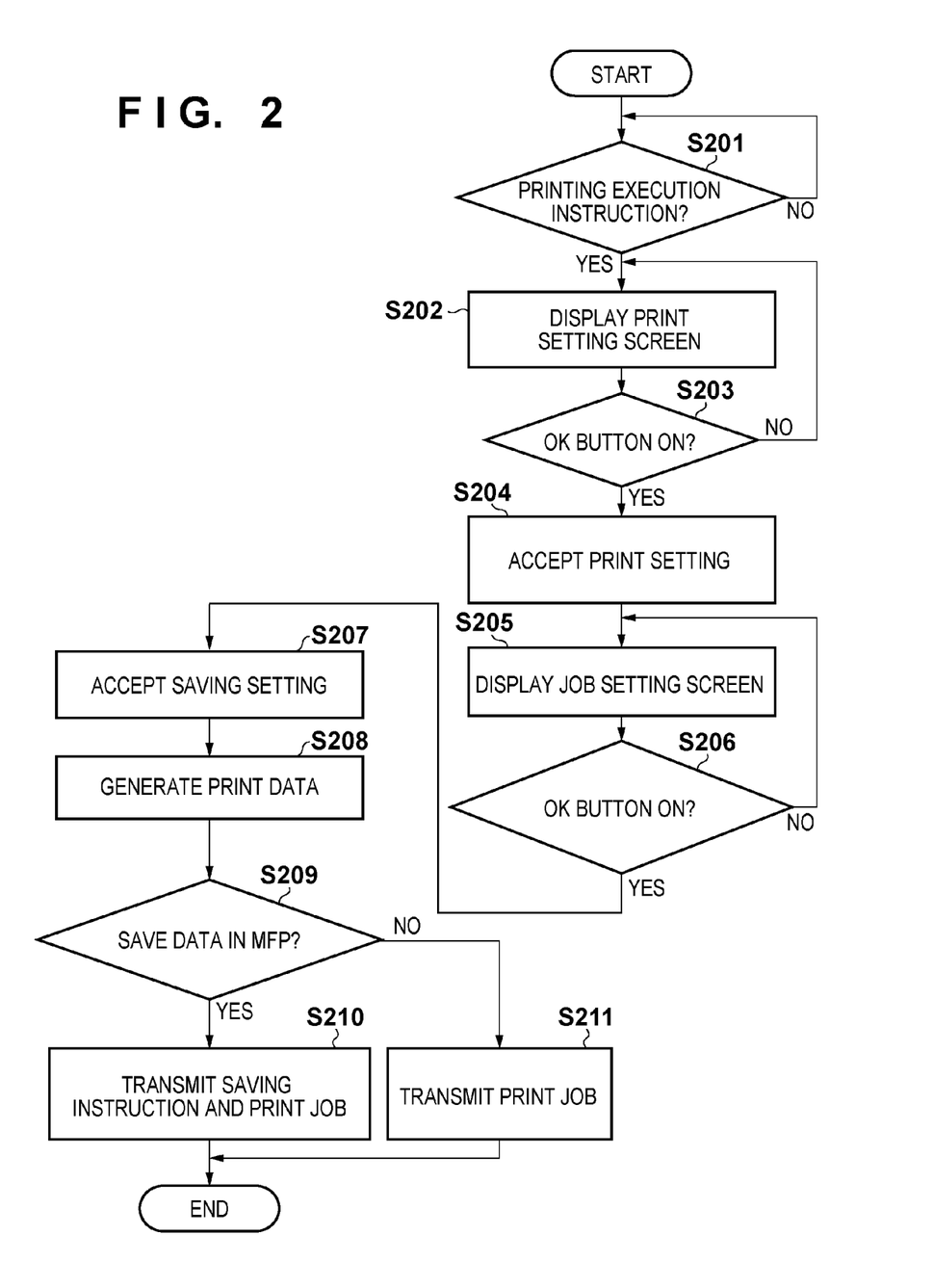
FIG. 2 is a flowchart showing a procedure of processing executed when a PC generates a print job according to the first embodiment.

Next is a description of print job generation processing executed by the PC 100 in the printing system of the present embodiment. FIG. 2 is a flowchart showing a procedure of the print job generation processing executed by the PC 100. Note that the operations in the steps in this flowchart are realized in the PC 100 by the control unit 101 reading out the application program 102a and the printer driver 102b stored in the HDD 102 to the RAM 103 and executing them. In the PC 100, the control unit 101 generates print data targeted for printing using the application program 102a. The control unit 101 also generates a print job including print settings using the printer driver 102b, and transmits the print job to the MFP 200.

In step S201, the control unit 101 determines whether a printing execution instruction was accepted via the operation unit 105. For example, by operating, via the operation unit 105, menu fields and the like included in a screen of the application program 102a being displayed by the display unit 104, the user can instruct the execution of printing using data related to the application program 102a. In step S201, the control unit 101 repeats the processing of step S201 as long as it has been determined that a printing execution instruction has not been accepted, and moves to the processing of step S202 when it has been determined that a printing execution instruction was accepted.

In step S202, the control unit 101 displays, on the display unit 104, a setting screen for designating (setting) print settings (print setting screen) by reading out the printer driver 102b from the HDD 102 to the RAM 103 and executing it. The print setting screen is a screen used when designating print settings, such as designating the sheet size, designating single-side printing or double-sided printing, designating the printing page layout, designating the binding margin, designating a magnification rate, designating saddle-stitch printing, and designating n-up printing. This print setting screen includes an OK button for accepting print settings designated by the user. The user inputs print settings in accordance with the print setting screen displayed by the display unit 104 in step S202.

Next, in step S203, the control unit 101 determines whether the OK button on the print setting screen was pressed (turned on) via the operation unit 105. The control unit 101 continues to display the print setting screen and accept the input of print settings as long as it has been determined that the OK button has not been pressed. On the other hand, if it is determined that the OK button was pressed, the control unit 101 moves to the processing of step S204 in which the settings input to the print setting screen are accepted as the print settings. The control unit 101 then moves to the processing of step S205.

In step S205, the control unit 101 displays, on the display unit 104 using the printer driver 102b, a job setting screen for designating whether the print data of the print job to be generated is to be saved in the MFP 200 that is the transmission destination of the print job. The job setting screen includes at least an item for inputting a saving setting indicating whether the print data is to be saved in the MFP 200, and an OK button for accepting the input setting.

Next, in step S206, the control unit 101 determines whether the OK button on the job setting screen was pressed (turned on) via the operation unit 105. The control unit 101 continues to display the job setting screen and accept the input of the saving setting as long as it has been determined that the OK button has not been pressed. On the other hand, if it is determined that the OK button was pressed, the control unit 101 moves to the processing of step S207, in which the setting input to the job setting screen is accepted as the saving setting. The control unit 101 then moves to the processing of step S208.

In step S208, the control unit 101 generates print data in units of pages using the printer driver 102b based on the print settings that were accepted in step S204. When the generation of the print data has been completed, the control unit 101 moves to the processing of steps S209 and S210 for transmitting a print job including the print data to the MFP 200. In step S209, the control unit 101 determines, based on the saving setting that was accepted in step S207, whether the print data generated in step S208 is to be saved in the MFP 200. Upon determining in step S209 that the print data is not to be saved, the control unit 101 moves to the processing of step S211 for generating a print job including the generated print data and print setting information and transmitting the generated print job to the MFP 200. On the other hand, upon determining in step S209 that the print data is to be saved, the control unit 101 moves to the processing of step S210 for generating a print job including the generated print data and print setting information, attaching a saving instruction to the generated print job, and transmitting the resulting print job to the MFP 200.

Print Processing in MFP 200

Figure 3:
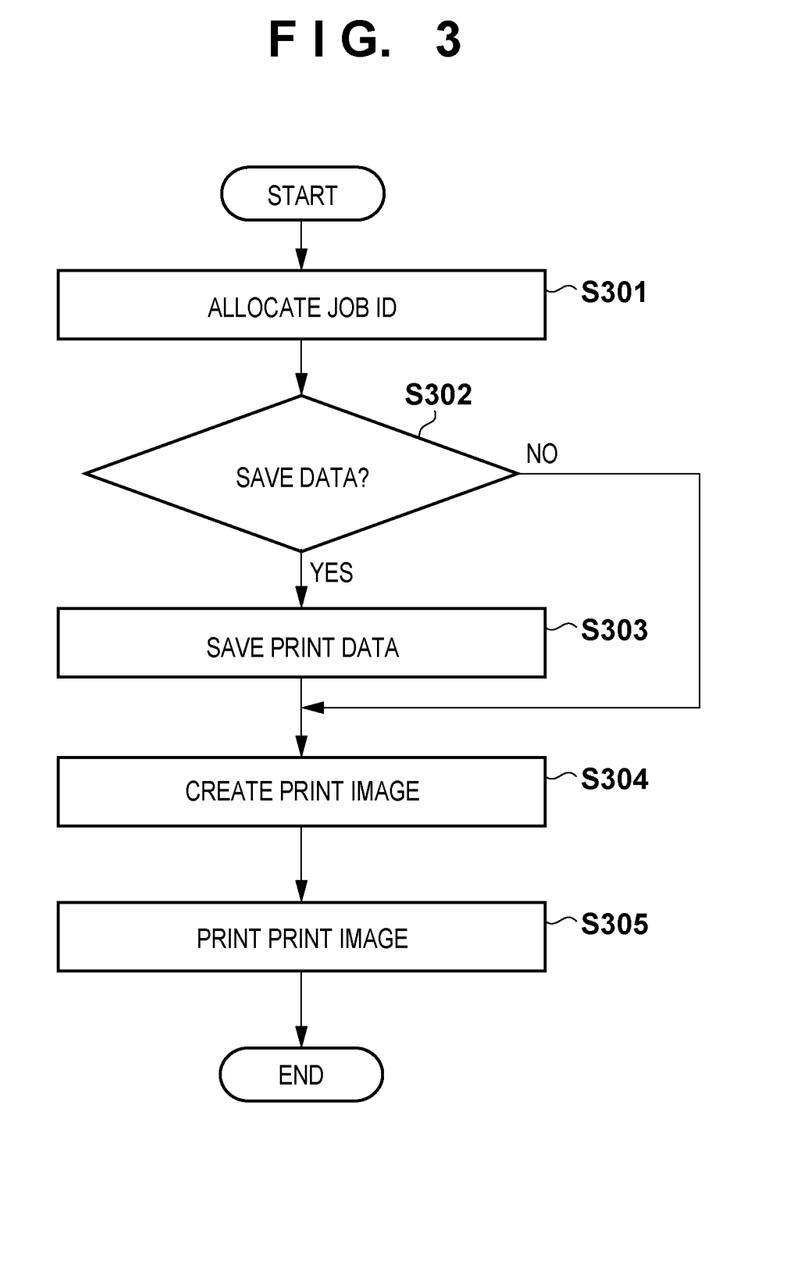
FIG. 3 is a flowchart showing a procedure of processing executed when printing is performed using a print job in an MFP according to the first embodiment.

Next is a description of print processing executed by the MFP 200 when a print job generated by the PC 100 has been received. FIG. 3 is a flowchart showing a procedure of print processing performed by the MFP 200 using a print job. Note that the operations of the steps in this flowchart are realized in the MFP 200 by the control unit 201 reading out a control program stored in the ROM 202 to the RAM 203 and executing it.

In step S301, the control unit 201 receives a print job from the PC 100 and allocates a job ID to the print job using the job management unit 207. Next, in step S303 the control unit 201 determines, based on whether the above-described saving instruction is attached to the received print job, whether the print data included in the print job is to be saved. Upon determining that the print data is not to be saved, the control unit 201 moves to the processing of step S304 without executing the processing of step S303.

Case where Print Data is not Saved

In step S304, the control unit 201 inputs the received print job to the image processing unit 211, and causes the image processing unit 211 to create a print image from the print data based on the print settings included in the print job. Thereafter, in step S305 the control unit 201 causes the created print image to be input from the image processing unit 211 to the print engine 212, and causes the print engine 212 to print the print image onto a sheet.

Case where Print Data is Saved

On the other hand, upon determining in step S302 that the print data is to be saved, the control unit 201 moves to the processing of step S303. In step S303, the control unit 201 causes the print data and print settings included in the received print job to be stored in the image memory 209, and notifies the job management unit 207 to that effect. The job management unit 207 holds, as a job management table (such as that shown in FIG. 5, for example), management information for managing information regarding print jobs received by the MFP 200. Upon receiving a notification from the control unit 201, the job management unit 207 manages information regarding the print job stored in the image memory 209 by adding the information regarding that print job to the job management table in association with the job ID. The control unit 201 then moves to the processing of step S304.

In step S304, the control unit 201 inputs the received print job to the image processing unit 211, and causes the image processing unit 211 to create a print image from the print data based on the print settings included in the print job. Thereafter, in step S305 the control unit 201 causes the created print image to be input from the image processing unit 211 to the print engine 212, and causes the print engine 212 to print the print image onto a sheet.

Reprint Processing in MFP 200

Figure 4:
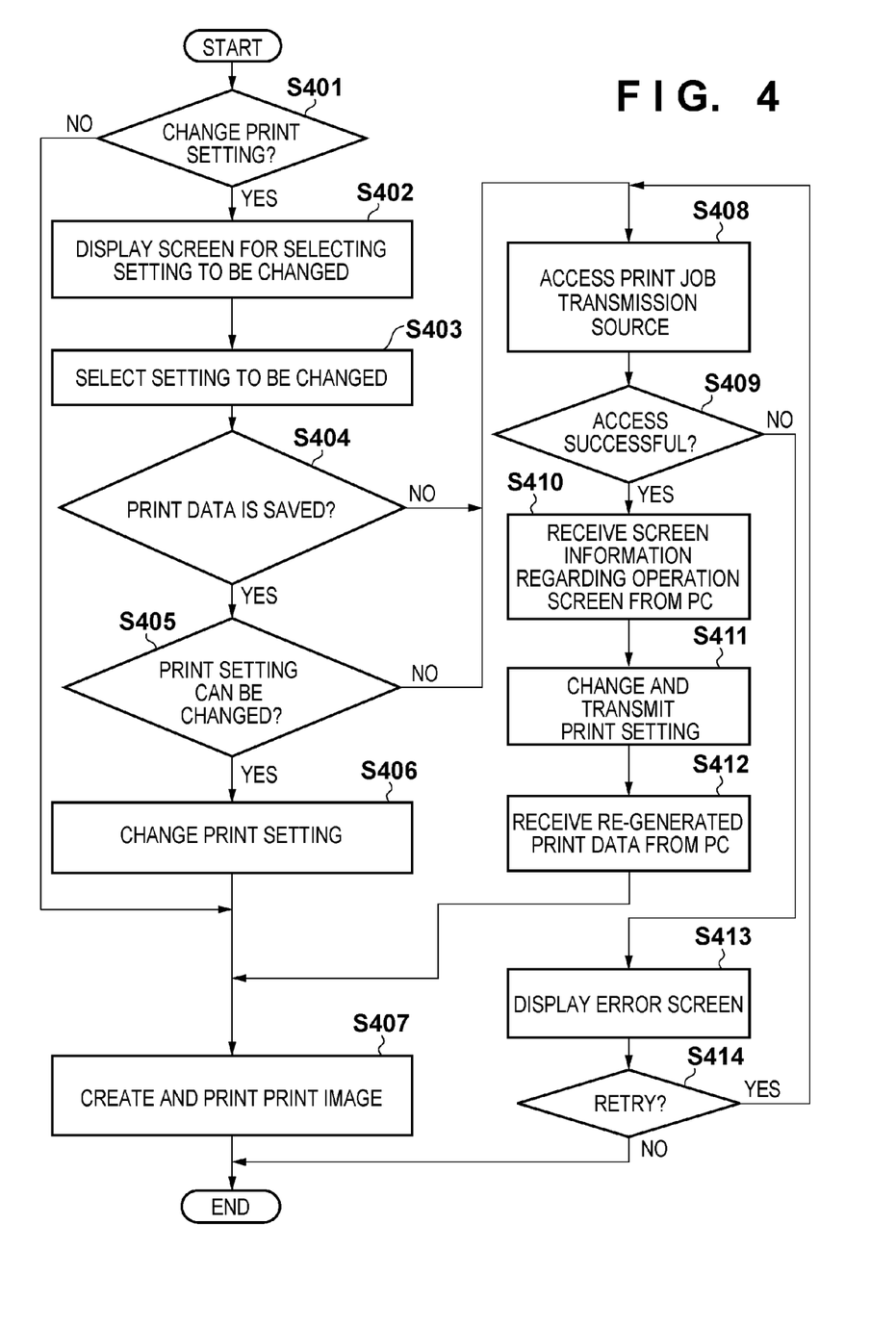
FIG. 4 is a flowchart showing a procedure of processing executed when reprinting is performed in the MFP according to the first embodiment.

In the present embodiment, the MFP 200 has a reprint control function for executing image reprinting based on information saved in a storage device (image memory 209) upon receiving a reprint instruction for a print job for which printing has already been performed. In the case where the user desires to change a print setting and re-perform printing after visually checking an image printed on a sheet, the MFP 200 can be caused to execute image reprinting using this function of the MFP 200. FIG. 4 is a flowchart showing a procedure of processing executed when reprinting is performed in the MFP 200. Note that the operations of the steps in this flowchart are realized in the MFP 200 by the control unit 201 reading out a control program stored in the ROM 202 to the RAM 203 and executing it.

The user logs in to the MFP 200 in order to start operating the MFP 200. At this time, the control unit 201 of the MFP 200 causes the authentication unit 210 to execute user login authentication based on authentication information input by the user via the operation unit 105, for example. Note that if the MFP 200 does not require login authentication, the user can start operating the MFP 200 without performing login. When the user logs in to the MFP 200 and issues, via the operation unit 105, an instruction to execute reprinting on a print job for which printing has already been executed, the control unit 201 starts executing the processing shown in the flowchart of FIG. 4.

Figure 5:
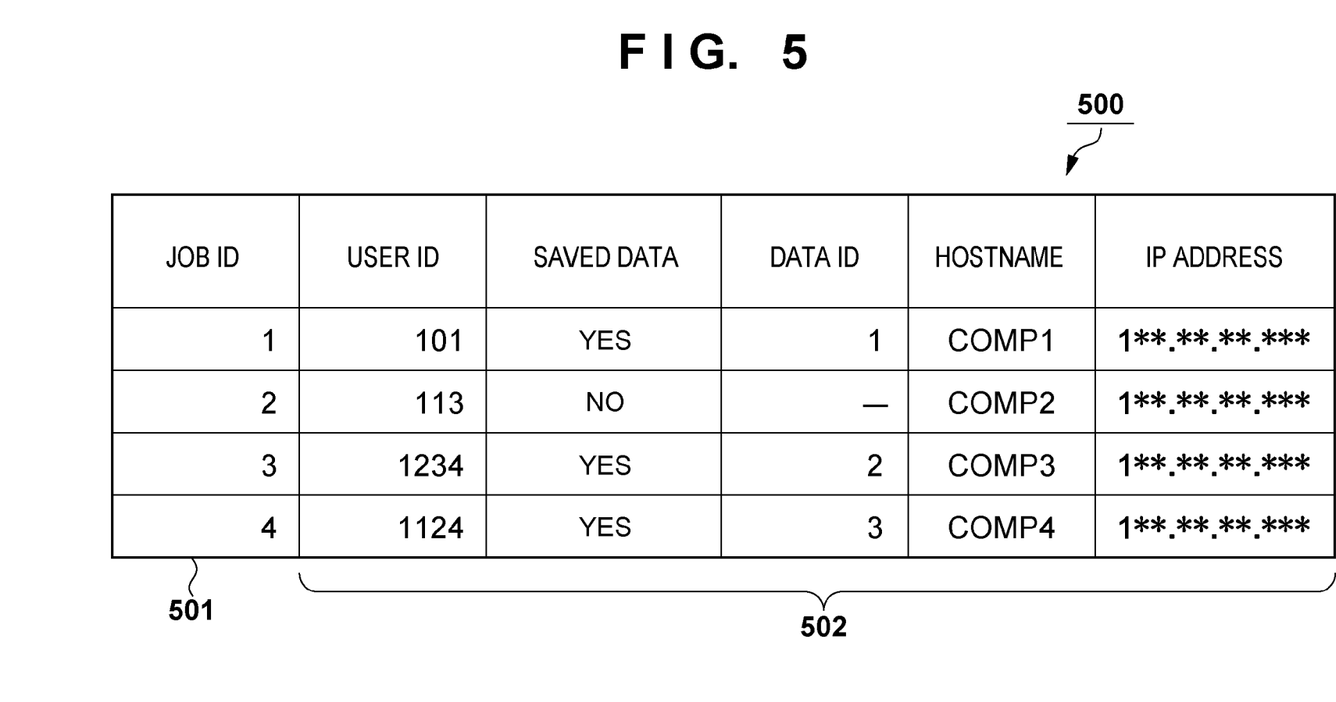
FIG. 5 is a diagram showing an example of a job management table according to the first embodiment.

First, the control unit 201 displays, on the display unit 205, a list of print jobs for which printing has been executed, which are managed by the job management unit 207. FIG. 5 shows an example of the job management table held by the job management unit 207 as management information, and this job management table includes information regarding print jobs stored in the image memory 209. In a job management table 500, job IDs 501 are registered in association with various types of information 502 regarding print jobs for which printing has been executed. For each print job, the information 502 includes, for example, information indicating the user ID of the user who executed the job and information indicating the presence or absence of data (print data) saved in the image memory 209. The information 502 also includes data IDs for saved data (IDs for a data name or file path for specifying data in the PC 100) and the hostname and IP address of the transmission source of the print jobs.

In step S401, in response to an instruction to reprint print data for which printing has been executed, the control unit 201 displays a list of print jobs on the display unit 205 and accepts a selection (designation) of a print job on which reprinting is to be executed. The user selects the print job that is to be reprinted from the list displayed on the display unit 205 by operating the operation unit 206. In step S401, the control unit 201 also accepts a designation of whether a print setting of the designated print job (hereinafter, referred to as the "target job") is to be changed.

Here, the control unit 201 determines whether a print setting of the target job is to be changed based on a user instruction given via the operation unit 206. In the case of determining in step S401 that a print setting is not to be changed, the control unit 201 moves to the processing of step S408 and executes reprinting on the target job. Specifically, in the case where the print data of the target job is saved in the image memory 209, that print data is read out and converted into a print image by the image processing unit 211, and the print image is printed onto a sheet by the print engine 212. Note that in the case where the print data of the target job is not saved in the image memory 209, the control unit 201 accesses the PC 100 via the network 300, obtains the print data from the PC 100, and executes printing as shown in steps S408 to S414.

Figure 6:
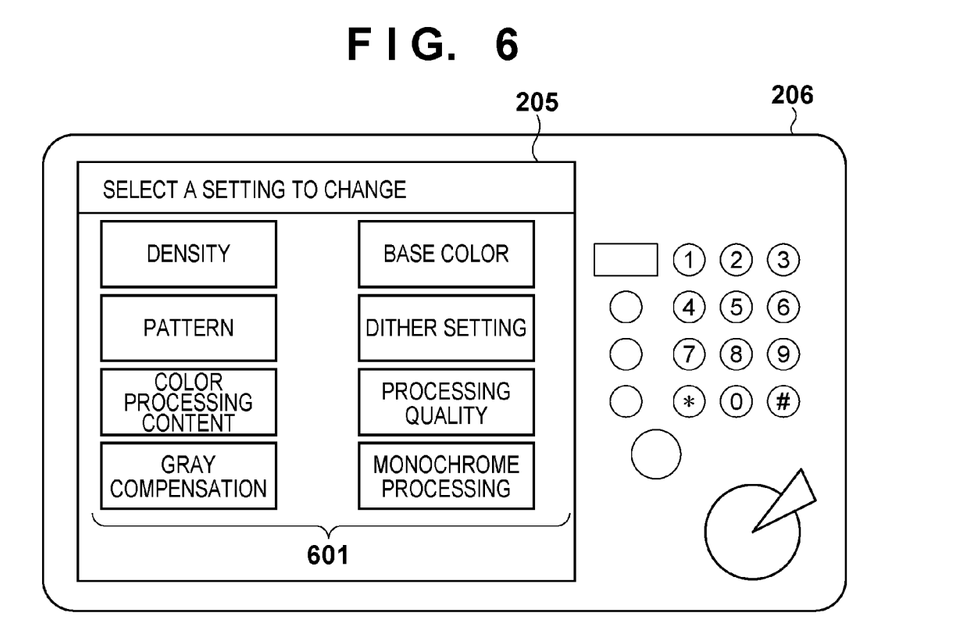
FIG. 6 shows an example of a selection screen displayed by a display unit when a user is to select a print setting to be changed in the MFP according to the first embodiment.

On the other hand, in the case of determining in step S401 that a print setting is to be changed, the control unit 201 moves to the processing of step S402 for displaying a selection screen regarding settings that are to be changed on the display unit 205. FIG. 6 shows an example of the selection screen displayed in step S402. Then, in step S403 the control unit 201 accepts the selection (designation) of a print setting that is to be changed based on the selection screen, and new settings regarding the selected print settings. Specifically, the user selects a print setting that is to be changed by using the touch panel of the operation unit 206 to press any of selections buttons 601 that are included in the selection screen displayed on the display unit 205 and correspond to individual print settings. The new settings (changed settings) for the selected print settings are then input. The control unit 201 then moves to the processing of step S404. In this way, in steps S401 to S403, the control unit 201 functions as a accepting unit that, in response to an instruction to reprint print data for which printing has been executed, accepts a designation of, from among the print settings set in the print data, a print setting that is to be changed when reprinting is performed.

Upon confirming that a setting to be changed has been selected, the control unit 201 then determines in step S404 whether the print data of the target job is saved in the image memory 209. In the case of determining that the print data is not saved, the control unit 201 moves to the processing of step S408 for causing the print data to be re-transmitted from the PC 100. On the other hand, in the case of determining that the print data is saved, the control unit 201 moves to the processing of step S405.

In step S405, the control unit 201 determines, whether the print setting selected in step S403 can be changed by the MFP 200 in the print data of the target job that is saved in the image memory 209. In other words, the control unit 201 determines whether the MFP 200 can change the print setting selected in step S403 and re-generate print data based on the changed print setting. Here, whether or not print data can be re-generated after changing various print settings depends on the format of the print data saved in the image memory 209 and the system configuration of the MFP 200.

Figure 7:
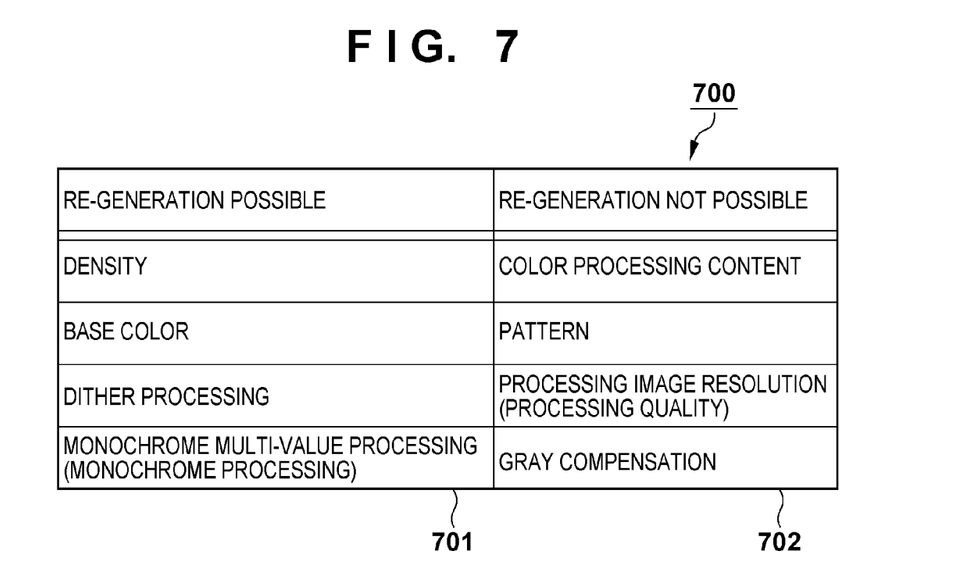
FIG. 7 shows an example of a list showing whether print data for reprinting can be re-generated after changing various print settings in the MFP according to the first embodiment.

FIG. 7 shows an example of a list showing whether print data for reprinting can be re-generated by the MFP 200 based on a changed print setting, in the case where various print settings of a print job have been changed in the printing system of the present embodiment. Note that a list 700 shown in FIG. 7 includes print settings 701 for which print data can be re-generated and print settings 702 for which print data cannot be re-generated, and these print settings correspond to the selection buttons 601 shown in FIG. 6. In FIG. 7, the print settings 701 for which print data can be re-generated correspond to print settings that, after print data has been received from the PC 100, are set for the print data at the time of printing by the image processing unit 211 in the MFP 200. On the other hand, the print settings 702 for which print data cannot be re-generated correspond to print settings that are set for print data by the PC 100 before print data is transmitted from the PC 100 to the MFP 200. In other words, the print settings 702 correspond to print settings that are set in print data by the application program 102a and the printer driver 102b that are installed in the PC 100.

In the present embodiment, the list 700 shown in FIG. 7 is held in advance in the image memory 209 of the MFP 200. The control unit 201 can execute the determination processing in step S405 by referencing the list held in advance in the image memory 209. In other words, the control unit 201 determines, based on the list, whether print data is to be re-generated based on print data stored in the image memory 209 after changing the print setting that was selected in step S403. Note that this list can be changed in accordance with updates to the system configuration of the MFP 200.

Returning to FIG. 4, in step S405, upon determining based on the above-described list 700 that the print setting selected in step S403 can be changed by the MFP 200 for the print data of the target job, the control unit 201 moves to the processing of step S406. On the other hand, upon determining that the print setting cannot be changed by the MFP 200, the control unit 201 moves to the processing of step S408 for causing the PC 100 to re-generate and re-transmit print data. In this way, in steps S404 and S405, the control unit 201 functions as a determination unit that determines whether print data can be re-generated based on print data stored in the image memory 209 after changing a designated print setting.

Case of Re-Generating Print Data in the MFP 200

In step S406, the control unit 201 displays a change screen for changing the print setting selected in step S403 on the display unit 205. Accordingly, the control unit 201 accepts an input of specific change content via the operation unit 206 (i.e., via the operation screen displayed on the display unit 205), and changes the print settings of the target job based on the input information. Here, the control unit 201 may enable the user to designate the number of print sets and the paper discharge location. The control unit 201 may also enable the user to designate print settings that can be changed in not only the PC 100, but the MFP 200 as well. For example, the control unit 201 may enable the user to execute, for example, the designation of n-up printing, the designation of single-side printing or double-sided printing, the designation of the printing page layout, the designation of the binding margin, the designation of a magnification rate, and the designation of saddle-stitch printing.

Next, in step S407, the control unit 201 controls the image processing unit 211 so as to create a print image from the print data stored in the image memory 209 based on the designated print settings and the print settings that were changed in step S406. In the present embodiment, the processing for creating a print image in step S407 corresponds to processing for re-regenerating print data. Lastly, the control unit 201 controls the image processing unit 211 so as to input the created print image to the print engine 212. Accordingly, the print engine 212 reprints the input print image onto sheets in units of pages.

Case of Re-Generating Print Data in the PC 100

In step S408, the control unit 201 attempts to access the host that is the transmission source of the target job (the PC 100 in this case) via the network 300 using the network I/F 208. The transmission source host can be specified from the job management table managed by the job management unit 207, for example. In this case, the control unit 201 extracts the hostname and IP address of the host that is the transmission source of the job from the information associated with the job ID of the target job in the job management table. The control unit 201 uses the extracted hostname and IP address to attempt to access the target job transmission source (the PC 100 in this case) via the network 300. Alternatively, the transmission source host may be statically registered in advance in the MFP 200, or may be able to be designated via the operation unit 206 each time the user logs in.

The control unit 201 transmits, to the PC 100, the authentication information obtained by the authentication unit 210 of the MFP 200 when the user logs in. Upon receiving the user authentication information from the MFP 200, the PC 100 determines whether access to the PC 100 from the MFP 200 is permitted, by executing user authentication using the received authentication information. The PC 100 then notifies the MFP 200 of whether access is permitted, via the network I/F 106 and the network 300.

In step S409, the control unit 201 determines whether access to the PC 100 was successful based on the notification from the PC 100. In the case of determining that access to the PC 100 was successful, the control unit 201 establishes a session between the MFP 200 and the PC 100, and then moves to the processing of step S410. On the other hand, in the case of determining that access to the PC 100 failed, the control unit 201 moves to the processing of step S413 for displaying an error screen to that effect on the display unit 205. The error screen is a screen for prompting the user to select whether access to the PC 100 is to be attempted again. In step S414, the control unit 201 determines whether access to the PC 100 is to be attempted again in accordance with the user selection. In the case of determining that access is to be attempted again, the control unit 201 returns to the processing of step S408, and in the case of determining that access is not to be attempted again, the control unit 201 ends this processing.

In steps S410 to S412, the control unit 201 issues, to the PC 100 via the network 300, an instruction to re-generate print data for the target job in which the print settings selected in step S403 have been changed, and causes the PC 100 to re-generate the print data. The control unit 201 then obtains the re-generated print data from the PC 100, and performs reprinting based on the print data. In other words, the control unit 201 functions as a reprinting control unit. Specifically, in steps S410 to S412, the control unit 201 executes the following processing using later-described remote desktop technology. According to this remote desktop technology, the control unit 201 remotely controls the PC 100 via the network 300 so as to re-generate print data, and obtains the re-generated print data from the PC 100. Note that details of access to the PC 100 using the remote desktop technology will be described later with reference to FIG. 8.

In step S410, when the control unit 201 establishes a session between the MFP 200 and the PC 100, the MFP 200 receives, from the PC 100, screen information for displaying the operation screen displayed on the display unit 104 of the PC 100. The control unit 201 then displays an operation screen on the display unit 205 based on the received screen information. Next, in step S411, the control unit 201 accepts an input of the content of change to the print setting selected in step S403 via the operation screen displayed on the display unit 205 (using the operation unit 206), and transmits the input change content to the PC 100.

The PC 100 receives the changed print settings from the MFP 200, and re-generates print data based on the received print settings. In step S412, the control unit 201 receives, from the PC 100, the print data that was re-generated by the PC 100. Thereafter, in step S407, the control unit 201 controls the image processing unit 211 so as to create a print image from the print data received from the PC 100. Lastly, the control unit 201 controls the image processing unit 211 so as to input the created print image to the print engine 212. Accordingly, the print engine 212 reprints the input print image onto sheets in units of pages.

Display Control Based on Remote Control Performed by MFP 200

Figure 8:
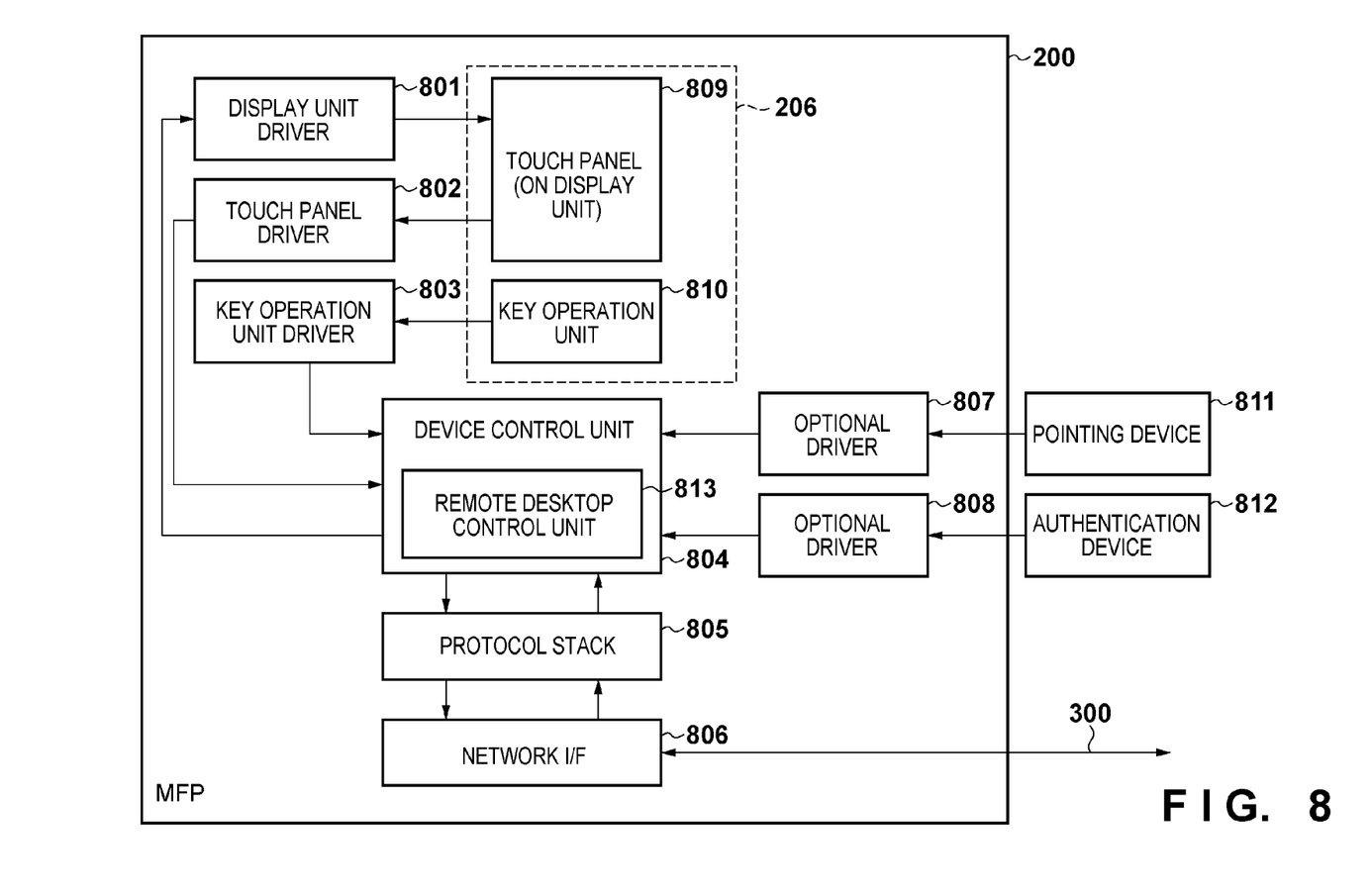
FIG. 8 is a diagram showing an example of a control configuration of the MFP according to the first embodiment.

Next is a description of display control realized by the MFP 200 remotely controlling the PC 100 using remote desktop technology in steps S410 to S412, with reference to FIG. 8. FIG. 8 is a diagram showing an example of the control configuration of the MFP 200 of the present embodiment. FIG. 8 focuses on the configuration related to display control in the present embodiment, and configurations related to other control are not shown.

The MFP 200 includes a display unit driver 801, a touch panel driver 802, a key operation unit driver 803, a device control unit 804, a protocol stack 805, and optional drivers 807 and 808, as software modules. The device control unit 804 has a remote desktop control unit 813. The MFP 200 furthermore includes a touch panel 809 and a key operation unit 810, which are provided in the operation unit 206 shown in FIG. 1. Note that the touch panel 809 is disposed in the operation unit 206 so as to be laid over the display unit 205.

The touch panel driver 802 notifies the remote desktop control unit 813 in the device control unit 804 of the content of user operations performed on the touch panel 809 included in the operation unit 206. The user can operate the touch panel 809 in accordance with the content displayed by the display unit 205. The key operation unit driver 803 notifies the remote desktop control unit 813 of the content of user operations performed on the key operation unit 810 included in the operation unit 206. The remote desktop control unit 813 establishes a session with the PC 100 by logging in to the PC 100 via the protocol stack 805 and the network I/F 208.

A pointing device 811 such as a mouse and an authentication device 812 such as a card reader or a fingerprint authentication apparatus can optionally be connected to the MFP 200. In the case where the pointing device 811 is connected to the MFP 200, the optional driver 807 notifies the remote desktop control unit 813 of the content of user operations performed using the pointing device 811. In the case where the authentication device 812 is connected to the MFP 200, the optional driver 808 receives authentication information that was input using the authentication device 812 from the authentication device 812, and notifies the remote desktop control unit 813 of the received authentication information.

The MFP 200 performs user authentication through operations performed on a keyboard (hard keys) provided in the key operation unit 810 or operations performed using the touch panel 809 on a keyboard (soft keys) displayed by the display unit 104. The MFP 200 also performs user authentication through operations performed by the authentication device 812 such as a card reader or a fingerprint authentication apparatus. The MFP 200 may perform user authentication using a combination of two or more of the above. Accordingly, the user can log in from the MFP 200 to a PC 100 that the user can use, such as the user's own PC disposed on the user's desk.

When the user logs in to the PC 100 from the MFP 200 (steps S409 and S410), the remote desktop control unit 813 in the MFP 200 and the PC 100 establish a session using the X-Window protocol, RDP, or the like. Processing in accordance with these protocols is executed by the protocol stack 805. The MFP 200 can perform remote desktop operations on the PC 100 using this session.

When the session has been established between the MFP 200 and the PC 100, the network I/F 208 receives the content of the screen (screen information) of the PC 100 from the PC 100. The network I/F 208 transmits the received PC 100 screen information to the protocol stack 805. The protocol stack 805 converts the received screen information so as to conform to the internal format of the MFP 200, and then transmits the converted screen information to the remote desktop control unit 813.

The remote desktop control unit 813 transmits the screen information received from the protocol stack 805 to the display unit driver 801. The display unit driver 801 constructs a screen in accordance with the screen information received from the remote desktop control unit 813, and displays the screen on the display unit 205. Here, in the case where the remote desktop control unit 813 transmits the screen information received from the protocol stack 805 to the display unit driver 801 in its original state, the display unit driver 801 displays the content of the PC 100 screen in its original state on the display unit 205. Also, in the case where the remote desktop control unit 813 selectively transmits, to the display unit driver 801, a corresponding part of the screen content in the screen information received from the protocol stack 805, the display unit driver 801 displays that part of the screen content on the display unit 205.

When a user operation is performed on the touch panel 809, the touch panel driver 802 receives, from the touch panel 809, operation information indicating coordinates on the touch panel 809 and an operation performed at those coordinates. The touch panel driver 802 transmits the received operation information to the remote desktop control unit 813. The remote desktop control unit 813 converts the received operation information into operation information from a standard mouse.

Specifically, the remote desktop control unit 813 maps the received operation information into operation information that indicates a corresponding operation and is generated when the mouse is operated. For example, an operation of touching the touch panel 809 corresponds to an operation of moving the mouse pointer to the touched position. An operation of tapping the touch panel 809 (touching and then immediately releasing the touch panel 809) corresponds to an operation of clicking the left button of the mouse. An operation of tapping the touch panel 809 twice corresponds to an operation of double-clicking the left button of the mouse. An operation of touching the touch panel 809 and then dragging the finger across the touch panel 809 corresponds to a click-and-drag operation performed using the left button of the mouse. Note that these corresponding relationships may be set and changed for each MFP 200. They may also be able to be set arbitrarily for each user that logs in. In this case, the corresponding relationships switch when the user switches.

The operation information converted by the remote desktop control unit 813 is transmitted to the protocol stack 805, and is then transmitted to the network 300 via the network I/F 208 in accordance with the above-described protocol, with the PC 100 as the transmission destination. Upon receiving the operation information from the MFP 200, the PC 100 processes the received operation information as information equivalent to operation information obtained using a locally-connected pointing device such as a mouse.

Also, as described above, while the content of the PC 100 screen is being displayed on the display unit 205, the key operation unit driver 803 transmits operation information indicating user operations performed on the key operation unit 810 to the remote desktop control unit 813. The remote desktop control unit 813 converts the received operation information into operation information from a standard keyboard and mouse.

Specifically, the remote desktop control unit 813 maps the received operation information into operation information that indicates a corresponding operation and is generated when the keyboard and mouse are operated. For example, an operation of pressing a start key corresponds to an operation of pressing the Enter key of a keyboard. An operation of pressing a clear/stop key corresponds to an operation of pressing the ESC key of a keyboard. An operation pressing a menu key corresponds to an operation of clicking the right button of a mouse. Note that these corresponding relationships may be set and changed for each MFP 200. They may also be able to be set arbitrarily for each user that logs in. In this case, the corresponding relationships switch when the user switches.

The operation information converted by the remote desktop control unit 813 is transmitted to the protocol stack 805, and is then transmitted to the network 300 via the network I/F 208 in accordance with the above-described protocol, with the PC 100 as the transmission destination. Upon receiving the operation information from the MFP 200, the PC 100 processes the received operation information as information equivalent to operation information obtained using a locally-connected keyboard and mouse.

As described above, according to the printing apparatus of the present embodiment, when printing is performed using print data received from a PC via a network, the print data is stored in a storage device for reprinting at a later time. When the reprinting of the print data is instructed, the printing apparatus accepts a designation of a print setting that is to be changed when reprinting is performed. Furthermore, the printing apparatus determines whether print data can be re-generated from the print data stored in the storage device after changing the designated print setting. Specifically, the printing apparatus determines whether the re-generation of the print data can be executed in the printing apparatus without being dependent on the PC that is the transmission source of the print data. In the case where the result of this determination is that the print data can be re-generated by the printing apparatus alone, the printing apparatus generates the print data from the print data stored in the storage device after changing a print setting, and executes reprinting. On the other hand, in the case where the print data cannot be re-generated by the printing apparatus alone, the printing apparatus accesses the PC via a network, causes the PC to re-generate the print data after changing a print setting, and then receives the re-generated print data from the PC. The printing apparatus then executes reprinting using the received print data.

In this way, according to the present embodiment, in the case where a print setting is to be changed and reprinting is to be performed, the printing apparatus causes the PC, via the network, to re-generate print data as necessary depending on whether the print data can be re-generated by the printing apparatus. Accordingly, in the case of reprinting, it is possible to minimize the number of times that the printing apparatus accesses and controls the PC via the network, thereby eliminating an unnecessary increase in the network load and processing load attributed to control performed via the network.

Furthermore, in the case where the print data needs to be re-generated by the PC, the printing apparatus obtains the re-generated print data from the PC via the network, thereby eliminating the need for the user to move to the location of the PC and operate it from there. Therefore, according to the present embodiment, user convenience can be improved without unnecessarily increasing the load attributed to remotely controlling the PC as described above.

Second Embodiment

Figure 9:
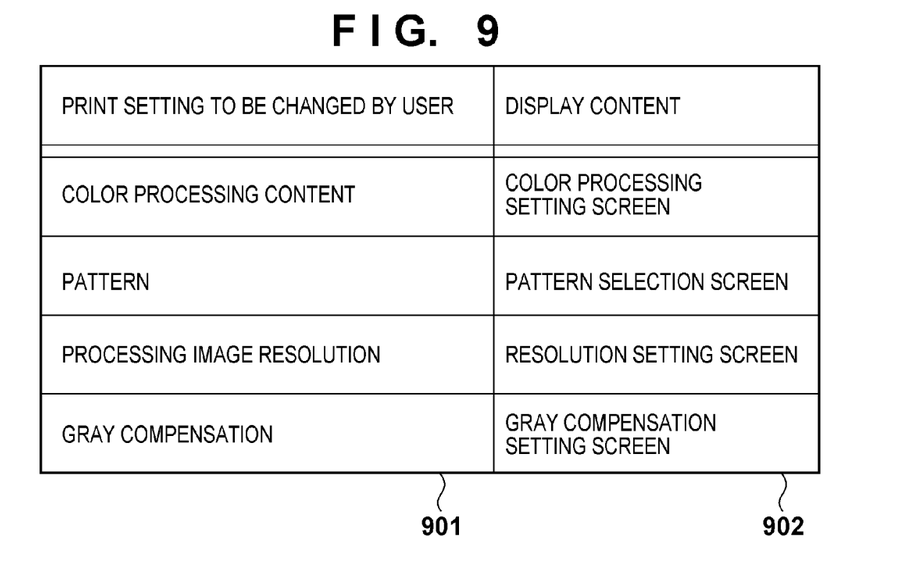
FIG. 9 is a diagram showing an example of the content of a screen generated by the PC in accordance with a print setting selected by a user according to a second embodiment.
Figure 10:
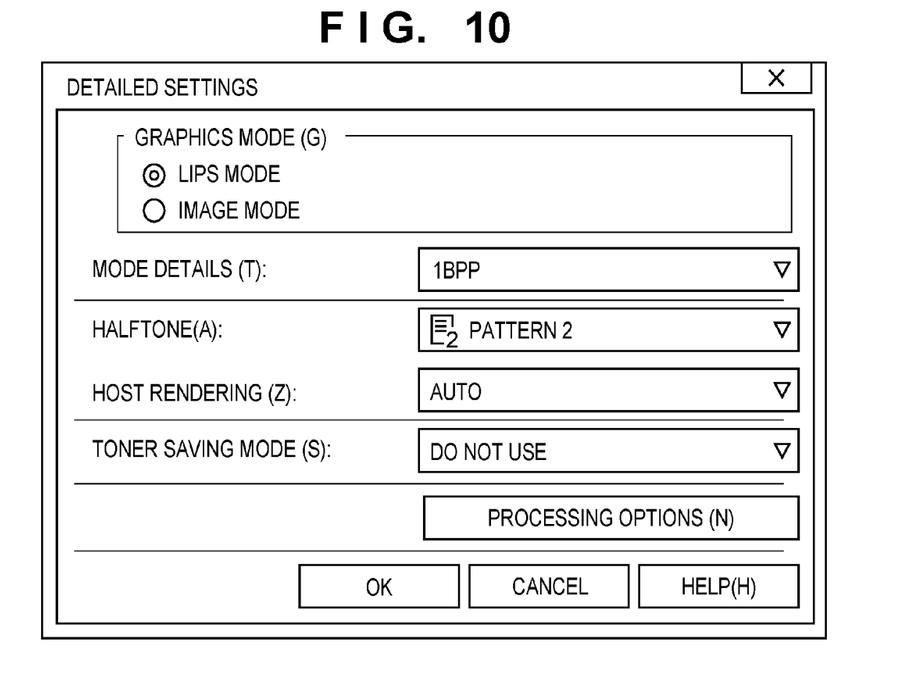
FIG. 10 is a diagram showing an example of an operation screen generated by the PC according to the second embodiment.
Figure 11:
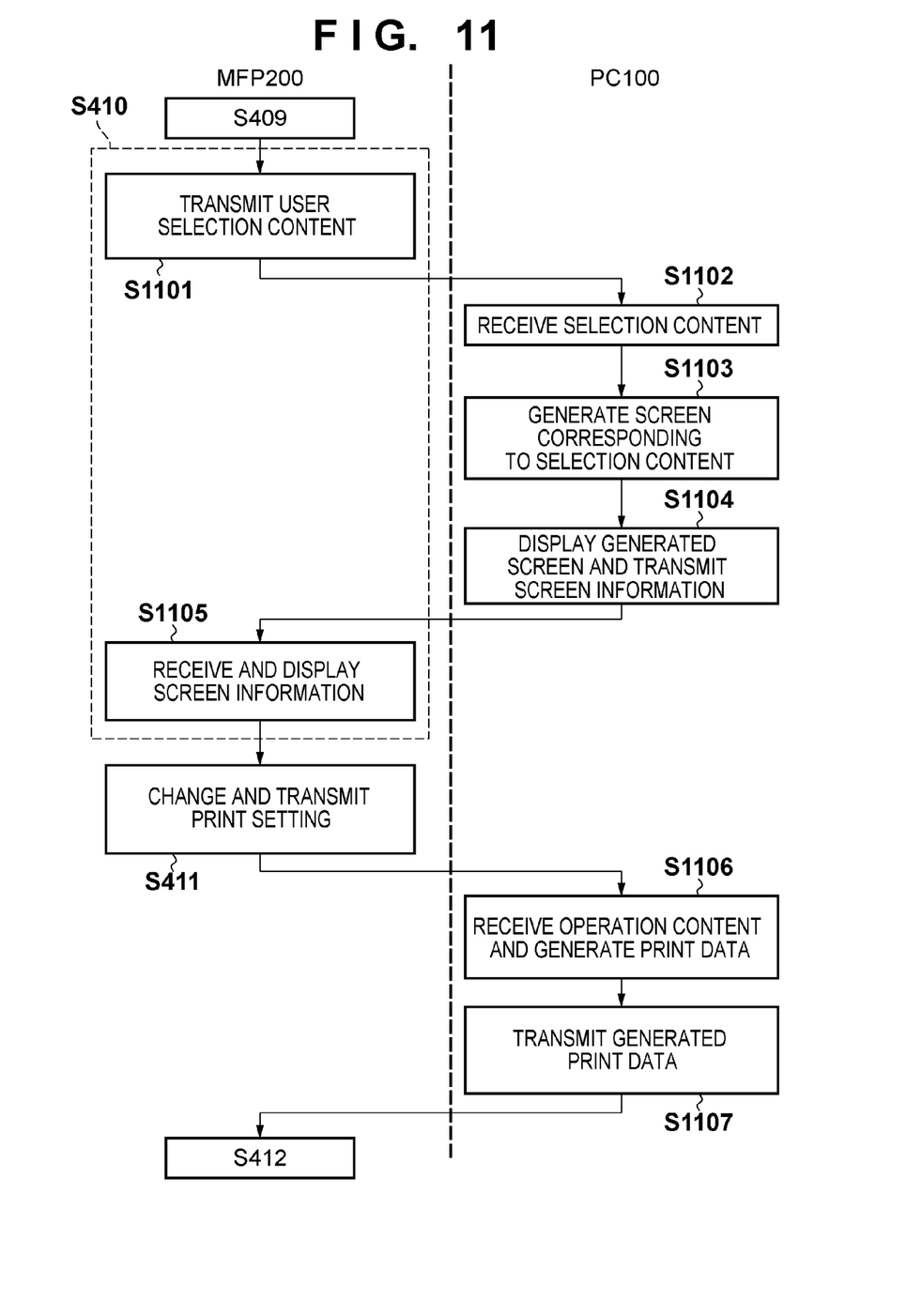
FIG. 11 is a diagram showing a flow of display control executed between the MFP and the PC according to the second embodiment.

The following describes, with reference to FIGS. 9 to 11, an embodiment in which, when the PC 100 transmits screen information to the MFP 200, screen information that has been made specific to print settings that are to be changed is generated. In the first embodiment, in step S411, a screen displayed on the display unit 104 of the PC 100 is displayed on the display unit 205 of the MFP 200 based on screen information transmitted from the PC 100 through remote desktop technology. In this case, it is possible that the displayed screen will be difficult to view and difficult to operate for the user due to, for example, the size of the display region of the display unit 205 of the MFP 200. For example, in the case where a screen of the entire display region of the display unit 104 of the PC 100 is to be displayed on the display unit 205 of the MFP 200, it is possible that the screen (window) for changing print settings in that screen will be displayed on the display unit 205 at a very small size. In this case, it is possible that operability will become worse for the user.

In view of this, in the second embodiment, out of the screens displayed in the display region of the display unit 104 of the PC 100, only the screen for performing an operation for changing the print setting selected in step S403 (FIG. 4) is displayed on the display unit 205 of the MFP 200 using remote desktop technology. FIG. 11 is a diagram showing the flow of display control executed between the MFP 200 and the PC 100 in steps S409 to S412 (FIG. 4).

In FIG. 11, steps S1101 and S1105 belong to step S410 executed by the control unit 201. When a session is established in step S409, the PC 100 and the MFP 200 start communication using that session. In step S1101, the control unit 201 of the MFP 200 transmits a notification indicating the content selected by the user (print setting and data ID) in step S403 from the network I/F 208 to the PC 100 in the session.

Next, in step S1102, the control unit 101 of the PC 100 receives the notification transmitted from the MFP 200 using the network I/F 106. In step S1103, based on the notification content indicated by the received notification, the control unit 101 generates an operation screen using the application program 102a and the printer driver 102b. Specifically, the application program 102a launches an application for opening data (a file) indicated by the data ID indicated by the received notification, and the printer driver 102b generates screen information regarding an operation screen for performing an operation for changing the print setting indicated by the received notification. Here, FIG. 9 shows an example of the screen content (902) generated by the PC in accordance with the print setting (901) selected by the user. Also, FIG. 10 shows an example of the operation screen generated by the PC 100 in step S1103. As shown in these figures, an operation screen that has been made specific to the print setting selected in step S403 is generated in step S1103. Thereafter, in step S1104, the control unit 101 displays the operation screen generated in step S1103 on the display unit 104, and transmits screen information regarding the operation screen to the MFP 200 via the network 300.

Next, in step S1105, the control unit 101 of the MFP 200 displays an operation screen based on the screen information received from the PC 100 on the display unit 205, and starts accepting user operations. In step S411, the control unit 101 accepts an input of the content of print setting changes via the operation unit 206 based on the operation screen displayed on the display unit 205. The control unit 101 then transmits information indicating the content of the input print setting changes to the PC 100.

In step S1106, the control unit 101 of the PC 100 receives information indicating the content of the print setting changes (operation content) from the MFP 200, and then changes the print settings of the target job in accordance with the content of the changes. The control unit 101 then re-generates print data based on the changed print settings using the printer driver 102b. When re-generation has been completed, in step S1107 the control unit 101 transmits the re-generated print data to the MFP 200. Thereafter, processing from S412 onward is executed in the MFP 200.

As described above, according to the present embodiment, out of the screens displayed in the display region of the display unit 104 of the PC 100, only an operation screen for performing an operation for changing a selected print setting is displayed on the display unit 205 of the MFP 200 using remote desktop technology. Accordingly, even in the case where, for example, the display region of the display unit 205 of the MFP 200 is small, it is possible for an operation screen of a sufficient size to be displayed in the display region. Also, when the user selects a print setting that is to be changed using the MFP 200, the display unit 205 of the MFP 200 can be caused to display an operation screen for changing the selected print setting. As a result, it is possible to improve operability for the user when changing print settings.

Note that in the above-described embodiment, in the case where the data (file) indicated by the data ID does not exist in the PC 100, it is sufficient for the PC 100 to detect this and notify the MFP 200 to that effect. In this case, in accordance with the notification, the control unit 201 of the MFP 200 notifies the user that the print setting cannot be changed since the data for which the print setting change was accepted does not exist.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-106622, filed May 11, 2011, which is hereby incorporated by reference herein in its entirety.

What is claimed is:

1. A printing apparatus comprising:
   a first reception unit configured to receive print data from an information processing apparatus;
   a storage unit configured to store the print data received by the first reception unit;
   an accepting unit configured to accept an instruction for changing a print setting for the print data stored by the storage unit;
   a determination unit configured to determine whether processing in accordance with the changed print setting can be executed by the printing apparatus;
   a display unit configured to display, if the determination unit determines that processing in accordance with the changed print setting cannot be executed by the printing apparatus, an operation screen that used to be displayed by a display unit of the information processing apparatus;
   an instruction unit configured to instruct the information processing apparatus to transmit print data on which processing in accordance with the changed print setting has been executed via the operation screen displayed by the display unit;
   a second reception unit configured to receive, from the information processing apparatus, the print data on which processing in accordance with the changed print setting was executed in accordance with the instruction given by the instruction unit; and
   a printing unit configured to execute printing in accordance with the print data received by the second reception unit.

2. The printing apparatus according to claim 1, further comprising:
   a processing unit configured to process, if the determination unit determined that processing in accordance with the changed print setting can be executed by the printing apparatus, the print data in accordance with the changed print setting,
   wherein the printing unit executes printing in accordance with the print data that was processed by the processing unit.

3. The printing apparatus according to claim 1, wherein the processing in accordance with the changed print setting is processing that can be executed by the information processing apparatus alone.

4. The printing apparatus according to claim 1, wherein if the processing in accordance with the changed print setting cannot be executed by the printing apparatus, the display unit displays a printer driver used to be displayed by the display unit of the information processing apparatus.

5. The printing apparatus according to claim 4, wherein if the processing in accordance with the changed print setting cannot be executed by the printing apparatus, the display unit displays the printer driver such that an item for changing the print setting for which the accepting unit accepted the instruction to change is displayed.

6. A method for controlling a printing apparatus comprising:
   receiving print data from an information processing apparatus;
   storing the print data received in the first receiving step in a storage unit;
   accepting an instruction for changing a print setting for the print data stored in the storage unit;
   determining whether processing in accordance with the changed print setting can be executed by the printing apparatus;
   displaying, if it was determined in the determining step that processing in accordance with the changed print setting cannot be executed by the printing apparatus, an operation screen that used to be displayed on a display unit of the information processing apparatus, on a display unit of the printing apparatus;
   instructing the information processing apparatus to transmit print data on which processing in accordance with the changed print setting was executed via the operation screen displayed on the display unit;
   receiving, from the information processing apparatus, the print data on which processing in accordance with the changed print setting was executed in accordance with the instruction given in the instructing step; and
   executing printing in accordance with the received print data.

7. A non-transitory computer-readable storage medium storing a computer program for causing a computer to execute a method for controlling a printing apparatus, the method comprising:
   receiving print data from an information processing apparatus;
   storing the print data received in the first receiving step in a storage unit;
   accepting an instruction for changing a print setting for the print data stored in the storage unit;
   determining whether processing in accordance with the changed print setting can be executed by the printing apparatus;
   displaying, if it was determined in the determining step that processing in accordance with the changed print setting cannot be executed by the printing apparatus, an operation screen that used to be displayed on a display unit of the information processing apparatus, on a display unit of the printing apparatus;
   instructing the information processing apparatus to transmit print data on which processing in accordance with the changed print setting was executed via the operation screen displayed on the display unit;
   receiving, from the information processing apparatus, the print data on which processing in accordance with the changed print setting was executed in accordance with the instruction given in the instructing step; and
   executing printing in accordance with the received print data.

* * * * *